United States Patent Office 2,841,609
Patented July 1, 1958

2,841,609

DEXTRO -6- DIMETHYLAMINO - 4,4 - DIPHENYL-5-METHYL-3-HEXANONE, SALTS THEREOF, AND PREPARATION THEREOF

Aubrey A. Larsen, Schodack Center, and Benjamin F. Tullar, East Greenbush, N. Y., assignors to Sterling Drug Inc., New York, N. Y., a corporation of Delaware No Drawing. Application December 1, 1953
Serial No. 395,602

2 Claims. (Cl. 260—465)

This invention relates to the dextro-rotatory stereoisomer of 6-dimethylamino-4,4-diphenyl-5-methyl-3-hexanone and its water soluble salts, and to a process for the preparation thereof.

It has been found that the levo-rotatory form of 6-dimethylamino-4,4-diphenyl-5-methyl-3-hexanone retains the large majority of the analgesic activity present in the racemate, whereas the dextro-form is relatively inactive as an analgesic agent. However, the dextro-form possesses valuable antitussive properties, and it can be used as an antitussive agent whereas the levo-form and racemate cannot because of their potent narcotic action.

The dextro-form of 6-dimethylamino-4,4-diphenyl-5-methyl-3-hexanone is ordinarily used in the form of water-soluble salts, derived from inorganic or organic acids, the anions of which are nontoxic and otherwise innocuous to the animal organism at the dosage levels required for therapeutic results. Examples of such acids include hydrochloric acid, hydrobromic acid, hydriodic acid, sulfuric acid, citric acid, tartaric acid, etc.

When diphenylacetonitrile is condensed with 1-dimethylamino-2-chloropropane in the presence of a base such as sodamide or potassium tertiary-butoxide, the major portion of the product consists of 2,2-diphenyl-4-dimethylaminopentanenitrile which can arise only by molecular rearrangement in the alkamine side-chain. The remainder, about 20–50% of the total product, is the normal condensation product, 2,2-diphenyl-3-methyl-4-dimethylaminobutanenitrile. The latter is the precursor of 6 - dimethylamino - 4,4 - diphenyl - 5 - methyl - 3 - hexanone. This latter compound is obtained by reaction of the nitrile with ethyl magnesium bromide, followed by hydrolysis.

The optically active isomers of 6-dimethylamino-4,4-diphenyl-5-methyl-3-hexanone may be obtained by either of two methods starting from racemic 2,2-diphenyl-3-methyl-4-dimethylaminobutanenitrile. The racemic nitrile (I) may be resolved, using dextro-tartaric acid into the levo-nitrile and dextro-nitrile. The latter are then respectively converted by the Grignard reaction into the dextro-ketone and levo-ketone. A reversal of sign in the optical rotation is observed upon conversion of the optically active nitriles to the optically active ketones. Alternatively, the racemic nitrile (I) may be converted by the Grignard reaction into the racemic ketone (II), which in turn is resolved with dextro-tartaric acid into the dextro-ketone and the levo-ketone. The following reaction chart illustrates the processes involved:

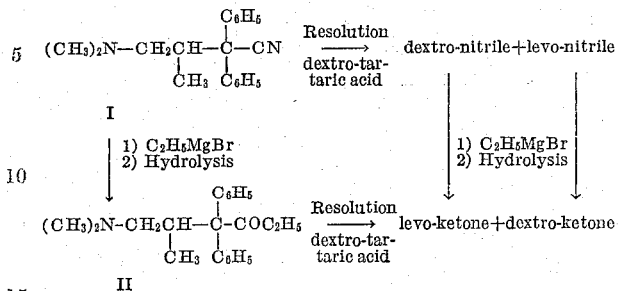

The solvent used for the resolutions is water or aqueous ethanol. The racemic nitrile is resolved by reacting it with slightly more than one equivalent of dextro-tartaric acid in 95% ethanol, giving in solution a mixture of the diastereoisomeric salts, dextro-nitrile dextro-bitartrate and levo-nitrile dextro-bitartrate. The former crystallizes preferentially upon cooling and is carried out most readily by seeding the solution with a trace of crystalline dextro-nitrile dextro-bitartrate. Fractional crystallization permits nearly complete separation of the two isomeric salts which precipitate in the hydrated form. The optically active nitriles themselves are produced by addition of strong base to solutions of the diastereoisomeric salts.

The dextro-bitartrate salts of the levo- and dextro-ketones are more soluble than those of the nitriles and water may be used as the resolution medium. In this case the levo-ketone dextro-bitartrate crystallizes preferentially.

It is also possible to use levo-tartaric acid for these resolutions. In this case the corresponding enantiomorphic salts crystallize preferentially, namely the levo-nitrile levo-bitartrate and the dextro-ketone levo-bitartrate.

EXAMPLE 1

(a) *Purification of 2,2 - diphenyl - 3 - methyl-4-dimethylaminobutanenitrile*

This is obtained from the condensation of diphenylacetonitrile and 1-dimethylamino-2-chloropropane, after removal of the large majority of 2,2-diphenyl-4-dimethylaminopentanenitrile, which is the main product of the reaction.

Five kg. of crude nitrile (M. P. 55–60° C.) is dissolved in 10 liters of isopropyl alcohol and treated with 1600 cc. of concentrated hydrochloric acid. The temperature climbs to about 50° C. by heat of reaction and crystallization of the hydrochloride starts almost at once. The mixture is cooled to 5° C. for one hour, and the product is filtered off and washed well with isopropanol and then with ether and dried at 60° C. for 24 hours; yield 4 kg. of nitrile hydrochloride, M. P. 223–225° C. This crop is dissolved in 35 liters of water, and the free nitrile base is crystallized out by slow addition of 1200 cc. of ammonium hydroxide after seeding. The base is filtered off, washed well with water and dried. The product is crystallized from 7 liters of isopropyl alcohol, yielding 3.3 kg., M. P. 67–68° C. By concentration a second crop of 0.23 kg. is obtained, which gives about 200 g., M. P. 67–68° C. upon recrystallization.

The hydrochloride liquor is concentrated in vacuo to 3.5 liters and cooled for 15 hours at 5° C. A second crop of crystalline hydrochloride is obtained, 675 g., M. P. 218–21° C. This is recrystallized from 3 liters of boiling isopropyl alcohol containing 100 cc. of water, giving about 500 g., M. P. 223–225° C., and a second crop which when recrystallized gives about 80 g., M. P. 223–225° C.

The remaining mother liquors contain mainly 2,2-diphenyl-4-dimethylaminopentanenitrile and its hydrochloride. After a crop of this has been removed as the free base, it is possible, by distillation of the residual oil and removal of the low boiling fraction, to isolate another 150 g. of pure 2,2-diphenyl-3-methyl-4-dimethylaminobutanenitrile hydrochloride.

(b) *Resolution of racemic 2,2-diphenyl-3-methyl-4-dimethylaminobutanenitrile*

Two kg. of racemic 2,2-diphenyl-3-methyl-4-dimethylaminobutanenitrile and 1120 g. of dextro-tartaric acid are dissolved in 15 liters of 95% ethyl alcohol. The solution is cooled to 5° C., seeded with a trace of the dextro-nitrile dextro-bitartrate if available, and allowed to stand at 5° C. for two days. Rapid crystallization without seeding can be obtained by stirring, but a precipitate is produced which filters very slowly, and the resolution will not be as effective. The solid is collected by filtration, washed with 2 liters of cold 95% alcohol and dried as thoroughly as possible on the suction filter. A sample converted to the free dextro-nitrile base has the M. P. 82–92° C. The crude salt is then dissolved in 4 liters of 95% alcohol at 50° C., cooled rapidly to 5° C. and kept at this temperature for 24 hours. The resulting precipitate is collected by filtration, washed with cold 95% alcohol and dried in vacuo to constant weight, giving about 1220 g. of dextro - 2,2 - diphenyl-3-methyl-4-dimethylaminobutanenitrile dextro-bitartrate, M. P. 75–95° C., $\alpha_D^{25°}=+63.8°$ (1.6% in $H_2O$).

The recrystallized dextro-nitrile dextro-bitartrate is converted to the dextro-nitrile by dissolving the salt in 15 liters of water and treating with ammonium hydroxide. The solution is seeded with a sample of the dextro-nitrile at the point of incipient turbidity, and the addition of ammonium hydroxide is finished slowly with good stirring to effect good crystallization. The base is separated, washed well with water, dried and recrystallized from 2 liters of 95% alcohol, yielding about 610 g. of pure dextro - 2,2 - diphenyl-3-methyl-4-dimethylaminobutanenitrile, M. P. 101.2–102.2° C. $[\alpha_D^{25°}=+70°]$. This corresponds to 61% of theory for the first phase of the resolution.

Additional amounts of the dextro-nitrile dextro-bitartrate are obtained by working up the combined resolution liquors as follows. When the combined mother liquors are allowed to stand at 25° C. for several days (or quite rapidly if seeded), a heavy crop of levo-2,2-diphenyl-3-methyl-4-dimethylaminobutanenitrile dextro-bitartrate is obtained. This solid is collected by filtration, washed with a little 95% alcohol and dried, giving about 690 g. or 40% of the theoretical amount of the levo-nitrile dextro-bitartrate of about 95% purity. The filtrate is concentrated to 10–20 liters and allowed to stand at 25° C. for 24 hours, whereupon a second crop of the levo-isomer separates, amounting to 13% of the theoretical. When the filtrate from this is cooled to 5° C. for 24 hours, 520 g. of the crude dextro-isomer separates which by recrystallization gives a 20% recovery of the pure dextro-salt.

(c) *levo-6-dimethylamino-4,4-diphenyl-5-methylhexanone-3 hydrobromide*

Dextro-2,2-diphenyl-3-methyl - 4 - dimethylaminobutanenitrile is converted into pure levo-6-dimethylamino-4,4-diphenyl-5-methylhexanone-3 hydrobromide in about 71.5% yield by treatment with ethyl magnesium bromide as described below in example 2 for the conversion of the racemic nitrile to the racemic ketone. The dextro-nitrile (610 g.) yielded about 613 g. of pure levo-6-dimethylamino-4,4-diphenyl - 5 - methyl - 3 - hexanone hydrobromide, M. P. 217–218° C. $[\alpha_D^{25°}=-59°$ (1.5% in $H_2O$)].

(d) *levo-6-dimethylamino-4,4-diphenyl-5-methyl-3-hexanone hydrochloride*

The hydrobromide prepared in part (c) is converted quantitatively to the free levo-ketone base and this in turn to the hydrochloride as described below in Example 2 (part c) for the conversion of levo-6-dimethylamino-4,4-diphenyl-5-methyl-3-hexanone dextro-bitartrate to the hydrochloride. The levo-ketone hydrobromide (603 g.) yields about 480 g. of levo-ketone base, which in turn is converted into about 526 g. or 95% of theory from the hydrobromide, of pure levo-6-dimethylamino-4,4-diphenyl-5-methyl-3-hexanone hydrochloride. The product thus obtained contains about 3.8% of moisture which can be removed by heating at 90–100° C. for 12–15 hours in vacuo. M. P. 229.5–231.5° C. $[\alpha_D^{25°}=-70°$ (1.6% in $H_2O$)].

In an attempted racemization of a sample of the levo-ketone hydrobromide by six hours of refluxing in constant boiling hydrochloride acid, a nearly quantitative recovery of pure levo-ketone hydrochloride was observed. Thus it is unnecessary to proceed through the base to prepare the hydrochloride from the hydrobromide.

EXAMPLE 2

(a) *Racemic 6-dimethylamino-4,4-diphenyl-5-methyl-3-hexanone hydrobromide*

Into a twelve-liter, three-neck flask equipped with a stirrer, dropping funnel, thermometer and condenser fitted with a drying tube, is placed 348 g. of magnesium turnings and 2250 cc. of ether which has been dried over sodium. A solution of 1560 g. (1090 cc.) of ethyl bromide in 750 cc. of dry ether is then slowly introduced through the dropping funnel over a period of three hours, cooling occasionally in an ice bath to maintain a temperature below 20° C. After all is added, an additional 100 cc. of ethyl bromide is introduced into the reaction mixture and stirring is continued for an additional 45 minutes to dissolve practically all of the remaining magnesium.

A solution of 1 kg. of racemic 2,2-diphenyl-3-methyl-4-dimethyl-aminobutanenitrile in 1500 cc. of dry toluene is then added in a steady stream over a period of two to three minutes with stirring. After distilling of the ether until an internal temperature of 106–108° C. is reached, the mixture is refluxed for two and one-half hours.

Hydrolysis is accomplished by carefully pouring the toluene suspension into a stirred solution of 4 liters of concentrated hydrochloric acid in 8750 cc. of water. (This must be carried out under an effective hood since a rather violent decomposition takes place during which time practically all of the toluene boils off.) Hydrolysis is completed by heating the resulting acidic solution under reflux for six hours.

The crude hydrobromide is isolated by cooling the hydrolysis mixture to about 5° C. in an ice bath while maintaining a slow rate of stirring. The light gray crystalline solid is collected by filtration, washed with a little cold water, about 0.5 liter of cold ethanol and finally with 1 liter of ether. After air drying, the solid weighs about 1065 g. representing a yield of 76%. It has the M. P. 143–148° C. Purification is accomplished by dissolving the crude hydrobromide in 2.5 liters of hot water, treating the solution with activated charcoal, and filtering with the aid of filtercel. The filter cake is washed with an additional 500 cc. of hot water. After cooling to 5° C. in an ice bath, white crystals of racemic 6 - dimethylamino-4,4-diphenyl-5-methyl-3-hexanone hydrobromide are formed which are collected on a suction funnel, washed with a small amount of cold water and pressed as dry as possible. The remaining moisture is removed by drying overnight in a vacuum chamber, giving about 980 g., M. P. 145–148° C., 70% of theory.

A second crop is obtained by concentration of the mother liquor to about 500 cc., cooling, and filtering. This material is combined with a small amount of crude material which gradually separates from the hydrolysis mother liquor on standing, and is recrystallized from water. After drying, it weighs about 95 g. and melts at 149–150° C. This represents a total yield of about 1075 g. or 76.5% of theory.

(b) *The resolution of racemic 6-dimethylamino-4,4-diphenyl-5-methyl-3-hexanone*

Racemic 6 - dimethylamino-4,4 - diphenyl-5 - methyl-3-hexanone hydrobromide (980 g.), M. P. 145–148° C., is dissolved in 7 liters of water at 70° C., made alkaline with 230 cc. of ammonium hydroxide, and cooled to 25° C. The viscous oily base is then extracted with 3 liters of ether. The extract is freed of ether and traces of water finally in vacuo, giving 780 g. of light yellow viscous oil. This oil is the free base, racemic 6-dimethylamino-4,4-diphenyl-5-methyl-3-hexanone, 760 g. of which is then dissolved in 2 liters of water along with 390 g. of dextro-tartaric acid and diluted with 6 liters of water. A trace of levo-6-dimethylamino-4,4-diphenyl-5-methyl-3-hexanone dextro-bitartrate is then added, and let stand for 24 hours at 20° C. while a heavy crop of crystals separates. This is collected by filtration and sucked as dry as possible on the filter. Without further drying this is dissolved in 3 liters of water and kept at 22° C. overnight. The glistening crystals are filtered off and dried as thoroughly as possible. A sample dried for four hours at 80° C. has an indefinite melting point and $\alpha_D^{25°} = -39°$ (1.7% in $H_2O$). The whole product is dissolved in 2 liters of water at 60–70 C. and allowed to stand at 22° C. for six to eight hours. The precipitate is separated, sucked dry, and dried in vacuo finally at 100° C. (8–10 mm.) for four hours. There is obtained 346 g. (60% of theory) of levo-6 - dimethylamino - 4,4 - diphenyl - 5 - methyl-3-hexanone dextro-bitartrate, M. P. 115–120° C., $\alpha_D^{25°} = -43°$.

A further 20% of the theoretical amount of levo isomer is readily recovered by the following procedure. The combined resolution liquor and first recrystallization liquor are treated with 500 cc. of concentrated hydrochloric acid. The crystalline precipitate which separates during one or two hours at room temperature is filtered off, washed with a little dilute hydrochloric acid and ice water, and dried. In this way nearly 300 g. of pure dextro-6-dimethylamino-4,4-diphenyl-5-methyl - 3 - hexanone hydrochloride is obtained, $\alpha_D^{25°} = +64°$ to $+66°$. The filtrate from the dextro-ketone is saturated with sodium chloride and cooled at 0° C., giving a second crop of hydrochloride which is slightly levo-rotating $$(\alpha_D^{25°} = -10°)$$

and amounting to 240 g.

The second tartrate recrystallization liquor, when treated as above with 200 cc. of concentrated hydrochloric acid, gives, as a first crop, 35 g. of nearly pure levo-6-dimethylamino-4,4-diphenyl-5-methyl-3 - hexanone hydrochloride, $\alpha_D^{25°} = -66°$. Addition of sodium chloride to the filtrate gives an additional 30 g. of what is essentially racemic 6-dimethylamino-4,4 - diphenyl-5-methyl - 3-hexanone hydrochloride, which with the above 240 g. of slightly levo-rotating material obtained above, is converted to the free base and the latter submitted to a second resolution yielding an additional 70 g. of pure levo-6-dimethylamino-4,4-diphenyl-5-methyl-3-hexanone hydrochloride. In this way, and by conversion of the bitartrate to the hydrochloride as given below in part (c), 80% of the theoretical amount of levo-ketone is obtained. Repetition of the steps outlined gives another 10%.

(c) *levo-6-dimethylamino-4,4-diphenyl-5-methylhexanone-3 and its hydrochloride*

A solution of 336 g. of levo-ketone dextro-bitartrate in 2 liters of water is made alkaline to phenolphthalein with ammonium hydroxide. The base is extracted with ether, the ether removed by distillation, and the product is dried in vacuo for one hour at 100° C., giving 220 g. of levo-6-dimethylamino-4,4-diphenyl-5-methyl-3-hexanone. The levo-ketone base (210 g.) is dissolved in 500 cc. of water and 60 cc. of concentrated hydrochloric acid at 90° C. The solution is filtered, and the flask and filter are rinsed with 200 cc. of boiling water. Upon cooling the combined filtrates to 5° C., a crystalline precipitate forms, which is collected by filtration, washed with 50 cc. of ice water, with 200 cc. of acetone and finally with ether. After fifteen hours at 90° C. (2 mm.), 223 g. or 95% of theory of white crystalline levo-6-dimethylamino-4,4-diphenyl-5-methyl-3-hexanone hydrochloride is obtained. The product still contains 0.5% of moisture and has the M. P. 231–233° C. with softening at 160° C., whereas the anhydrous salt exhibits no sintering below the true melting point; $\alpha_D^{25°} = -70°$ (1.5% in $H_2O$).

A second recrystallization of the bitartrate and conversion to the base is not necessary. If the once-recrystallized bitartrate is dissolved in 4–5 liters of water and acidified to Congo red with hydrochloric acid, 60–65% yield of pure levo-hydrochloride crystallizes out at room temperature.

The following table summarizes some physical constants of resolved 2,2-diphenyl-3-methyl-4-dimethylaminobutanenitrile and 6-dimethylamino-4,4-diphenyl-5-methyl-3-hexanone, and some of their water-soluble salts.

| | M. P., ° C. | $D^{25°}$ |
|---|---|---|
| dextro-nitrile base | 101–102 | +70 |
| dextro-nitrile dextro-bitartrate | 95–110 | +64.5 |
| dextro-nitrile hydrochloride | 226–228 | +75 |
| levo-nitrile base | 102–103 | −70 |
| levo-nitrile dextro-bitartrate | 105–107 | −45 |
| levo-nitrile hydrochloride | 226–227 | −75 |
| levo-ketone base | oil | −20 |
| levo-ketone dextro-bitartrate | 122–125 | −44 |
| levo-ketone hydrochloride | 231–233 | −70 |
| levo-ketone hydrobromide | 217–218 | −59 |
| dextro-ketone base | oil | +20.8 |
| dextro-ketone dextro-bitartrate | 148–152 | +60 |
| dextro-ketone hydrochloride (monohydrate) | 176–177 | +66 |
| dextro-ketone hydrochloride (anhydrous) | 231–232 | +70 |

This application is a continuation-in-part of our copending application, Serial No. 15,267, filed March 16, 1948, now U. S. Patent 2,773,901.

We claim:

1. The process of preparing dextro-6-dimethylamino-4,4-diphenyl-5-methyl-3-hexanone which comprises reacting racemic 2,2-diphenyl-3-methyl-4-dimethylaminobutanenitrile of the formula

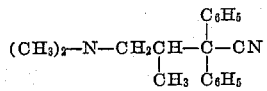

with at least one equivalent of dextro-tartaric acid to form a mixture of diastereoisomeric salts, separating dextro - 2,2 - diphenyl - 3 - methyl - 4 - dimethylaminobutanenitrile dextro-bitartrate from said diastereoisomeric salt mixture by fractional crystallization, separating the levo - 2,2 - diphenyl - 3 - methyl - 4 - dimethylaminobutanenitrile dextro-bitartrate from the mother liquors remaining after removal of the major part of the dextro isomer, liberating the free levo-nitrile by reacting said levo - 2,2 - diphenyl - 3 - methyl - 4 - dimethylaminobutanenitrile dextro-bitartrate with an excess of a strong base, reacting said levo-nitrile with ethyl magnesium bromide, and hydrolyzing the resulting Grignard complex by heating it with mineral acid.

2. The process which comprises reacting racemic 2,2-diphenyl-3-methyl-4-dimethylaminobutanenitrile of the formula

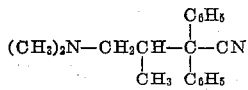

with at least one equivalent of dextro-tartaric acid to form a mixture of disasteroisomeric salts, separating dexro - 2,2 - diphenyl - 3 - methyl - 4 - dimethylaminobutanenitrile dextro-bitartrate from said diastereoisomeric salt mixture by fractional crystallization, separating the levo - 2,2 - diphenyl - 3 - methyl - 4 - dimethylaminobutanenitrile dextro-bitartrate from the mother liquors remaining after removal of the major part of the dextro isomer, and liberating the free levo-nitrile by reacting said levo-2,2-diphenyl-3-methyl-4-dimethylaminobutanenitrile dextro-bitartrate with an excess of a strong base.

References Cited in the file of this patent

UNITED STATES PATENTS 2,538,130 Sletzinger et al.  Jan. 16, 1951

OTHER REFERENCES

Karrer: "Organic Chemistry," Nordemann Pub. Co. Inc., New York, N. Y., 1938, pages 91–92.

Schultz et al.: J. Am. Chem. Soc., vol. 69 (1947), pages 2454–9.

Schultz et al.: J. Am. Chem. Soc., vol. 69 (1947), pages 188–9.

Easton et al.: J. Am. Chem. Soc., vol. 69 (1947), pages 976–7.

Winter et al.: Proc. Soc. Exptl. Biol. and Med., 81, 463–5 (November 1952).

UNITED STATES PATENT OFFICE
CERTIFICATE OF CORRECTION

Patent No. 2,841,609                                                                 July 1, 1958

Aubrey A. Larsen et al.

It is hereby certified that error appears in the printed specification of the above numbered patent requiring correction and that the said Letters Patent should read as corrected below.

Column 3, line 66, for "10-20 liters" read -- 10-12 liters --.

Signed and sealed this 4th day of November 1958.

(SEAL)
Attest:

KARL H. AXLINE                                                    ROBERT C. WATSON
Attesting Officer                                                Commissioner of Patents